United States Patent
Ai

(10) Patent No.: US 9,049,614 B2
(45) Date of Patent: Jun. 2, 2015

(54) METHOD AND DEVICE FOR HANDLING MOBILITY MANAGEMENT CONTEXT

(75) Inventor: Ming Ai, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 129 days.

(21) Appl. No.: 13/701,759

(22) PCT Filed: Sep. 29, 2011

(86) PCT No.: PCT/CN2011/080324
§ 371 (c)(1),
(2), (4) Date: Feb. 12, 2013

(87) PCT Pub. No.: WO2012/041238
PCT Pub. Date: Apr. 5, 2012

(65) Prior Publication Data
US 2013/0272120 A1    Oct. 17, 2013

(30) Foreign Application Priority Data
Sep. 30, 2010    (CN) .......................... 2010 1 0504082

(51) Int. Cl.
*H04L 12/28*    (2006.01)
*H04W 28/02*    (2009.01)
(Continued)

(52) U.S. Cl.
CPC ............ *H04W 28/0289* (2013.01); *H04W 8/02* (2013.01); *H04W 76/068* (2013.01)

(58) Field of Classification Search
CPC ........... H04L 12/1886; H04W 76/027; H04W 76/068; H04W 36/0033
USPC .......................................... 370/230; 455/423
See application file for complete search history.

(56) References Cited

U.S. PATENT DOCUMENTS

2008/0076434 A1* 3/2008 Shigaki et al. ................ 455/442
2009/0258596 A1* 10/2009 Naik et al. .................... 455/41.2
(Continued)

FOREIGN PATENT DOCUMENTS

| CN | 1863398 A | 11/2006 |
| CN | 101572942 A | 11/2009 |
| WO | WO 03/013165 A1 | 2/2003 |

OTHER PUBLICATIONS

International Search Report in PCT/CN2011/080324 mailed Jan. 5, 2012.
(Continued)

*Primary Examiner* — Wanda Z Russell
(74) *Attorney, Agent, or Firm* — Marshall, Gerstein & Borun LLP

(57) ABSTRACT

Embodiments of the present application relate to the technical field of wireless communications, relating specifically to a method and a device for handling a mobility management context, for use in solving the problem in the prior art of an increase in signaling consumption or network load due to the absence of a defined duration of storage for the mobility management context on a network side. The method comprises: upon a network congestion and rejecting a request from a terminal, a network side device activating a first context timer for the terminal; if the request of the terminal is received and accepted before the first context timer times out, the network side device retaining a mobility management context corresponding to the terminal; if the request of the terminal is not received, or is received but not accepted before the first context timer times out, the network side device deleting the mobility management context corresponding to the terminal. As the duration of storage is defined for the mobility management context on the network side, the signaling consumption and the network load are thereby reduced.

16 Claims, 2 Drawing Sheets

(51) Int. Cl.
*H04W 8/02* (2009.01)
*H04W 76/06* (2009.01)

(56) References Cited

U.S. PATENT DOCUMENTS

| | | | |
|---|---|---|---|
| 2010/0061331 A1* | 3/2010 | Guo et al. | 370/329 |
| 2010/0313024 A1* | 12/2010 | Weniger et al. | 713/170 |
| 2010/0329169 A1* | 12/2010 | de Bruin et al. | 370/312 |
| 2012/0057584 A1* | 3/2012 | Johansson et al. | 370/338 |
| 2012/0142336 A1* | 6/2012 | Van Phan et al. | 455/423 |

OTHER PUBLICATIONS

"3rd Generation Partnership Project: Technical Specification Group Services and System Aspects; System Improvements for Machine-Type Communications; (Release 10)," 3GPP Standard, 3GPP TR 23.888, 3rd Generation Partnership Project (3GPP), No. V1.1.0, Sep. 22, 2010, 80 pages.

"3rd Generation Partnership Project: Technical Specification Group Services and System Aspects; General Packet Radio Service (GPRS) Enhancements for Evolved Universal Terrestrial Radio Access Network (E-UTRAN) Access; (Release 10)," 3GPP Standard, 3GPP TS 23.401, 3rd Generation Partnership Project (3GPP), No. V10.1.0, Sep. 29, 2010, 266 pages.

"3rd Generation Partnership Project: Technical Specification Group Services and System Aspects; General Packet Radio Service (GPRS); Service Description; Stage 2; (Release 10)," 3GPP Standard, 3GPP TS 23.060, 3rd Generation Partnership Project (3GPP), No. V10.1.0, Sep. 29, 2010, 304 pages.

Supplementary European Search Report in European Application No. 11828134.4 dated Oct. 15, 2013, 5 pages.

\* cited by examiner

METHOD AND DEVICE FOR HANDLING MOBILITY MANAGEMENT CONTEXT

This application is a US National Stage of International Application No. PCT/CN2011/080324, filed on 29 Sep. 2011, designating the United States, and claiming priority from Chinese Patent Application No. 201010504082.5 filed with the Chinese Patent Office on Sep. 30, 2010 and entitled "Method and Device for Handling Mobility Management Context", which is herein incorporated by reference in its entirety.

FIELD OF THE INVENTION

The present invention relates to the technical field of wireless communications and particularly to a method and device for handling a mobility management context.

BACKGROUND OF THE INVENTION

In the course of formulating the Machine to Machine (M2M) specification of the 3$^{rd}$ Generation Partnership Project (3GPP), a congestion control mechanism based upon an Access Point Name (APN) is specified and is also decided to be used for an APN congestion situation arising from a general User Equipment (UE).

It is specified in this mechanism that subscription data of a UE shall be stored at the network side for a period of time when an Attach/Tracking Area Update (TAU) request from the UE is rejected at the network side due to APN congestion.

Subscription information of a UE is stored in a mobility management context of the UE, and the value of storing the mobility management context has not been specified so far.

If the mobility management context is deleted at the network side too early, when the UE requests again for Evolved Packet System (EPS) Mobility Management (EMM)/EPS Session Management (ESM), a mobility management node, e.g., a Mobility Management Entity (MME), a Serving GPRS Support Node (SGSN), has no subscription information of the UE and thus have to interact again with a Home Subscriber Server (HSS)/a Home Location Register (HLR), thereby increasing signaling consumption; and if the mobility management node deletes the mobility management context too late, the context of the UE may be stored at the mobility management node for a too long period of time, thus increasing load at the network side.

In summary, the value of storing the mobility management context at the network side is not specified so far, and consequently signaling consumption and network load may be increased.

SUMMARY OF THE INVENTION

Embodiments of the invention provide a method and device for handling a mobility management context so as to address the problem in the prior art of increasing signaling consumption or network load due to the absence of a specified value of storing the mobility management context at the network side.

An embodiment of the invention provides a method for handling a mobility management context, which includes:
 starting, by a network-side device, a first context timer for a terminal after a network is congested and a request from the terminal is rejected;
 keeping, by the network-side device, a mobility management context corresponding to the terminal if the request from the terminal is received and accepted before the first context timer expires; and
 deleting, by the network-side device, the mobility management context corresponding to the terminal if the request from the terminal is not received or the request from the terminal is received but not accepted before the first context timer expires.

An embodiment of the invention provides another method for handling a mobility management context, which includes:
 starting, by a network-side device, a second context timer after a network is congested; and
 keeping, by the network-side device, a mobility management context corresponding to a first terminal and deleting a mobility management context corresponding to a second terminal after the second context timer expires,
 wherein the first terminal is a terminal from which a request transmitted is accepted by the network-side device after the network is congested and before the second context timer expires; and the second terminal is a terminal from which all the requests transmitted are rejected by the network-side device after the network is congested and before the second context timer expires.

An embodiment of the invention provides a network-side device for handling a mobility management context, which includes:
 a first starting module configured to start a first context timer for a terminal after a network is congested and a request from the terminal is rejected;
 a first managing module configured to keep a mobility management context corresponding to the terminal when the request from the terminal is received and accepted before the first context timer expires and to delete the mobility management context corresponding to the terminal when the request from the terminal is not received or the request from the terminal is received but not accepted before the first context timer expires.

An embodiment of the invention provides another network-side device for handling a mobility management context, which includes:
 a second starting module configured to start a second context timer after a network is congested; and
 a second managing module configured to keep a mobility management context corresponding to a first terminal and to delete a mobility management context corresponding to a second terminal after the second context timer expires,
 wherein the first terminal is a terminal from which a request transmitted is accepted by the network-side device after the network is congested and before the second context timer expires; and the second terminal is a terminal from which all the requests transmitted are rejected by the network-side device after the network is congested and before the second context timer expires.

Since the value of storing the mobility management context at the network side is specified, signaling consumption and network load are thereby reduced, and resource utilization ratio is further improved.

DETAILED DESCRIPTION OF THE EMBODIMENTS

In embodiments of the invention, a network-side device can start a context timer after a network is congested, and after the context timer expires, delete a mobility management context corresponding to a terminal from which all the requests transmitted are rejected in a period of time starting from the network congestion until the context timer expires. Since the value of storing the mobility management context at the network side is specified, signaling consumption and network load are thereby reduced.

Particularly the network congestion in the embodiments of the invention includes but will not be limited to one or more of the following congestion:

Mobility Management Entity (MME) congestion, Packet Data Network (PDN) Gateway (GW) congestion, Serving GW (SGW) congestion and Serving GPRS Support Node (SGSN) congestion.

The request in the embodiments of the invention is one of a request of an EMM procedure, a request of an ESM procedure, a request of a GMM procedure and a request of a GSM procedure.

The EMM procedure refers to an EPS mobility management procedure including but not limited to one or more of ATTACH, TAU, DETACH, Service Request, Extended Service Request, Transport of NAS messages, Generic transport of NAS messages and other procedures.

The ESM procedure refers to an EPS session management procedure including but not limited to one or more of a PDN connectivity procedure, a PDN disconnect procedure, a bearer resource allocation procedure, a bearer resource modification procedure, default EPS bearer context activation, dedicated EPS bearer context activation, EPS bearer context modification, EPS bearer context deactivation, an ESM information request procedure, a notification procedure and other procedures.

The GMM procedure refers to a General Packet Radio Service (GPRS) Mobility Management procedure including but not limited to one or more of GPRS ATTACH, GPRS DETACH, Routing Area Updating (RAU) and other procedures.

The GSM procedure refers to a GPRS Session Management procedure including but not limited to one or more of Packet Data Protocol (PDP) Context Activation, PDP Context Deactivation, Secondary PDP Context Activation, a PDP context modification procedure, a notification procedure and other procedures.

When receiving a request from another Core Network (CN) node, the network-side device in the embodiments of the invention can process the request according to an existing flow.

The embodiments of the invention will be described below in further details with reference to the drawings.

Figure 1:
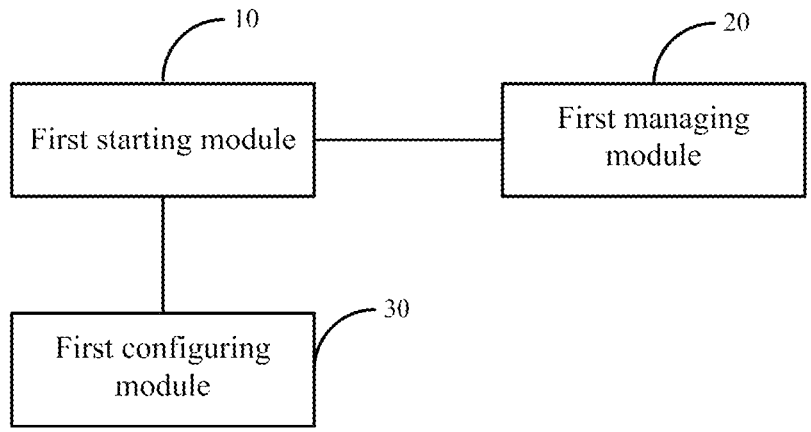
FIG. 1 is a schematic structure diagram of a first network-side device for handling a mobility management context according to an embodiment of the invention.

As illustrated in FIG. 1, a first network-side device for handling a mobility management context according to an embodiment of the invention includes a first starting module 10 and a first managing module 20.

The first starting module 10 is configured to start a first context timer for a terminal after a network is congested and a request from the terminal is rejected.

The first managing module 20 is configured to keep a mobility management context corresponding to the terminal when the request from the terminal is received and accepted before the first context timer expires and to delete the mobility management context corresponding to the terminal when the request from the terminal is not received or the request from the terminal is received but not accepted before the first context timer expires.

Particularly, after the network is congested, the first starting module 10 may reject the request from the terminal after receiving the request from the terminal and can start one first context timer for the terminal if the request is rejected. In other words, one first context timer is only for one terminal, and a plurality of first context timers will be started if all the requests of a plurality of terminals are rejected after the network is congested.

Preferably, the network-side device according to the embodiment of the invention can further include a first configuring module 30 in order to enable the rejected terminal to reinitiate a request in a reasonable period of time.

The first configuring module 30 is configured to send to the terminal a mobility management back-off timer after the network is congested and the request from the terminal is rejected and before the first context timer is started for the terminal.

Specifically, the first configuring module 30 can send to the terminal the mobility management back-off timer via a Non Access Stratum (NAS) message.

The configured mobility management back-off timer includes an identifier and value of the mobility management back-off timer; and the terminal knows from the identifier that what has been configured is a mobility management back-off timer when receiving the configuration and then starts the mobility management back-off timer according to the value and retransmits a request after the mobility management back-off timer expires.

Here the value of the first context timer shall be longer than that of the mobility management back-off timer. For example, the value of the first context timer can be determined according to the value of the mobility management back-off timer, and if the value of the mobility management back-off timer is longer than the current value of the first context timer, the first starting module 10 shall adjust the value of the first context timer; or the value of the mobility management back-off timer can be determined according to the value of the first context timer, and if the value of the mobility management back-off timer is longer than the current value of the first context timer, the first configuring module 30 shall adjust the value of the mobility management back-off timer.

Alternatively the value of the first context timer can be determined according to an operator strategy, and if there is the mobility management back-off timer, the value of the first context timer shall be ensured to be longer than that of the mobility management back-off timer.

Several operator strategies will be listed below.

Strategy 1: An operator can determine how long the network will be congested according to statistical data of network operation, e.g., five hours, and at this time the value of the first context timer can be configured by the network to five hours or a slightly longer time.

Strategy 2: The value of the first context timer is configured to one hour so long as the congestion occurs. If the congestion is not removed after one hour, the value of the first context timer is further configured to one hour. The value of the timer is equally configured like this.

Strategy 3: The value of the first context timer is configured to one hour so long as the congestion occurs. If the congestion is not removed after one hour, the value of the first context timer is further configured to two hours. The value of the timer is incrementally configured like this. Of course, the value of the timer can alternatively be decrementally configured.

Strategy 4: The value of the first context timer is configured by a human operator through an operation, maintenance and administration system of the network when the congestion occurs.

Strategy 5: An operator can determine how long the network will be congested according to statistical data of network operation, e.g., five hours, and at this time the value of the first context timer can be configured by the network to five hours, and If the congestion is not removed after five hours, the value can be further configured to five hours or to another preset value (fixed sequentially) or to four hours (decremented sequentially) or to six hours (incremented sequentially).

It shall be noted that the strategy in the embodiment of the invention will not be limited to the foregoing five strategies and other strategies capable of setting the value of the timer will also be applicable to the embodiment of the invention.

In an implementation, the network-side device can be configured with a specific value, and the first managing module 20 can determine when the first timer will expire according to the specific value (L), for example, the first timer can expire at a point of time which is the current time plus L, or the value can be counted down directly and that the first timer expires can be determined when the value becomes zero.

Alternatively the network-side device can be configured with a point of time, and the first managing module 20 can take this point of time as the point of time when the first timer expires.

In view of such a scenario possibly occurring that the network congestion may be removed very soon and a request from the terminal can be accepted but the first timer has not expired, a preferable scheme may be that the first starting module 10 stops the first context timer after the request from the terminal is received and accepted before the first context timer expires.

The first managing module 20 can delete the mobility management context by directly deleting locally the mobility management context corresponding to the terminal. This scheme is applicable to such a scenario that the mobility management context includes an EPS bearer or includes no EPS bearer.

If the mobility management context includes an EPS bearer and/or a PDP context, another deletion scheme in addition to the foregoing scheme is as follows:

The first managing module 20 initiates an implicit detach procedure to delete the mobility management context corresponding to the terminal.

A specific implicit deletion procedure can refer to the 3GPP TS23.401 and TS23.060 protocols.

In a specific implementation, the first context timer can be a mobile reachable timer or an implicit detach timer or a new timer.

The network-side device according to the embodiment of the invention can be a node B (e.g., a macro node B, an evolved node B, a home node B, etc.) or a Relay Node (RN) device or an MME or another network-side device.

Based upon the same inventive idea, a first method for handling a mobility management context is provided in an embodiment of the invention, and since this method addresses the problem under a similar principle to the first network-side device for handling a mobility management context, an implementation of this method can refer to the implementation of the first network-side device for handling a mobility management context, a repeated description of which will be omitted here.

Figure 2:
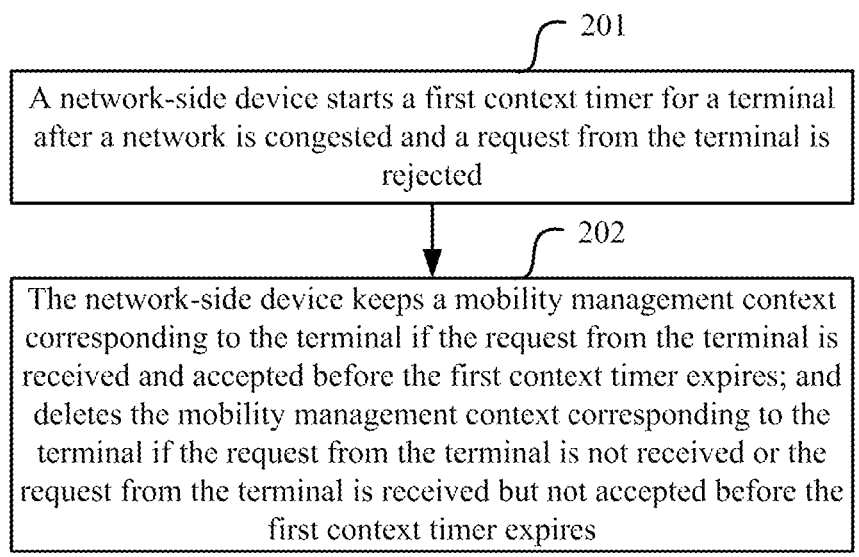
FIG. 2 is a schematic flow chart of a first method for handling a mobility management context according to an embodiment of the invention.

As illustrated in FIG. 2, a first method for handling a mobility management context according to an embodiment of the invention includes the following steps:

Step 201. A network-side device starts a first context timer for a terminal after a network is congested and a request from the terminal is rejected.

Step 202. The network-side device keeps a mobility management context corresponding to the terminal if the request from the terminal is received and accepted before the first context timer expires; and deletes the mobility management context corresponding to the terminal if the request from the terminal is received or the request from the terminal is received but not accepted before the first context timer expires.

In the step 201, the network-side device may reject the request from the terminal when receiving the request from the terminal after the network is congested and can start one first context timer for the terminal if the request is rejected. In other words, one first context timer is only for one terminal, and a plurality of first context timers will be started if all the requests of a plurality of terminals are rejected after the network is congested.

Preferably, in order to enable the rejected terminal to reinitiate a request in a reasonable period of time, the network-side device sends to the terminal a mobility management back-off timer after the network is congested and the request from the terminal is rejected and before the first context timer is started for the terminal.

Specifically, the network-side device can send to the terminal the mobility management back-off timer via an NAS message.

The configured mobility management back-off timer includes an identifier and value of the mobility management back-off timer.

Here the value of the first context timer shall be longer than that of the mobility management back-off timer.

The value of the first context timer can also be determined according to an operator strategy, and if there is the mobility management back-off timer, the value of the first context timer shall be ensured to be longer than that of the mobility management back-off timer. A specific strategy can refer to the strategies in FIG. 1, a repeated description of which will be omitted here.

In an implementation, the network-side device can be configured with a specific value, and the network-side device can determine when the first timer will expire according to the specific value (L), for example, the first timer expires at a point of time which is the current time plus L, or the value is counted down directly and that the first timer expires is determined when the value becomes zero.

Alternatively the network-side device can be configured with a point of time, and the network-side device can take this point of time as the point of time when the first timer expires.

In view of such a scenario possibly occurring that the network congestion may be removed very soon and the request from the terminal can be accepted but the first timer has not expired, a preferable scheme may be that the network-side device stops the first context timer after the request from the terminal is received and accepted before the first context timer expires.

In the step 202, the network-side device can delete the mobility management context by directly deleting locally the mobility management context corresponding to the terminal. This scheme is applicable to such a scenario that the mobility management context includes an EPS bearer or includes no EPS bearer.

If the mobility management context includes an EPS bearer and/or a PDP context, another deletion scheme in addition to the foregoing scheme is as follows:

The network-side device initiates an implicit detach procedure to delete the mobility management context corresponding to the terminal.

A specific implicit deletion procedure can refer to the 3GPP TS23.401 and TS23.060 protocols.

In a specific implementation, the first context timer can be a mobile reachable timer or an implicit detach timer or a new timer.

The network-side device according to the embodiment of the invention can be a node B (e.g., a macro node B, an evolved node B, a home node B, etc.) or an RN device or an MME or another network-side device.

Figure 3:
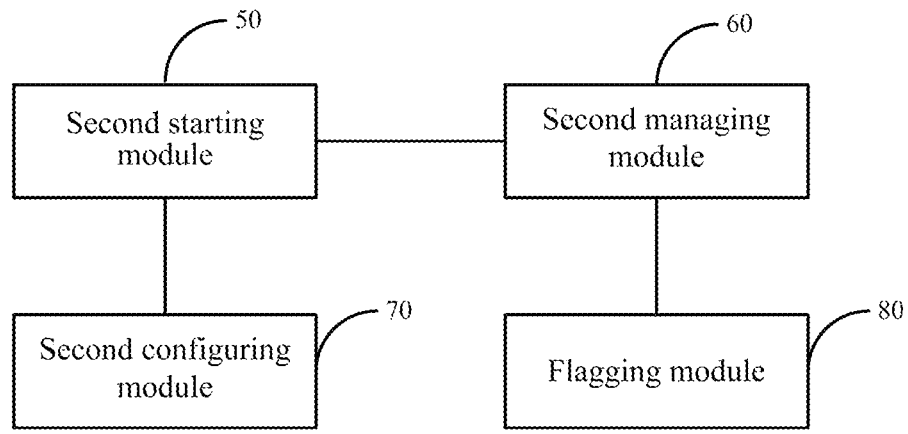
FIG. 3 is a schematic structure diagram of a second network-side device for handling a mobility management context according to an embodiment of the invention.

As illustrated in FIG. 3, a second network-side device for handling a mobility management context according to an embodiment of the invention includes a second starting module 50 and a second managing module 60.

The second starting module 50 is configured to start a second context timer when a network is congested.

The second managing module 60 is configured to keep a mobility management context corresponding to a first terminal and to delete a mobility management context corresponding to a second terminal after the second context timer expires.

Wherein the first terminal is a terminal from which one or more requests transmitted is accepted by the network-side device after the network is congested and before the second context timer expires; and the second terminal is a terminal from which all the requests transmitted are rejected by the network-side device after the network is congested and before the second context timer expires.

A number of terminals may initiate requests after the network is congested and before the second context timer expires, and the request from a terminal may be rejected by the network-side device if the network is congested. Among the terminals from which the requests transmitted are received by the network-side device, the terminal from which the request transmitted is accepted is referred to as the first terminal, and the other terminals are referred to as the second terminals.

In an implementation, the second starting module 50 can start the second context timer immediately after the network is congested; or can start the second context timer immediately after the network congestion is removed.

In the scenario that the second context timer is started immediately after the network congestion is removed, after the network is congested and before the network congestion is removed, the second context timer is not started, and the network-side device will consider that the second context timer has not expired.

Here unlike the first solution to handling a mobility management context according to the embodiment of the invention where the first solution to handling a mobility management context is specific to one UE (per UE) (that is, one timer corresponds to one terminal), the second solution to handling a mobility management context according to the embodiment of the invention is specific to one node (per node) (that is, there is only one timer for all the terminals, where only one timer will be started regardless of the number of terminals).

Preferably, the network-side device according to the embodiment of the invention can further include a second configuring module 70 in order to enable the rejected terminal to reinitiate a request in a reasonable period of time.

The second configuring module 70 is configured to send to the terminal a mobility management back-off timer after the network is congested and the request from the terminal is rejected.

Specifically, the second configuring module 70 can send to the terminal the mobility management back-off timer via an NAS message.

The configured mobility management back-off timer includes an identifier and value of the mobility management back-off timer; and the terminal knows from the identifier that what has been configured is a mobility management back-off timer when receiving the configuration and then starts the mobility management back-off timer according to the value and retransmits a request after the mobility management back-off timer expires.

If the second starting module 50 starts the second context timer immediately after the network is congested, the value of the second context timer shall be longer than that of the mobility management back-off timer. For example, the value of the second context timer can be determined according to the value of the mobility management back-off timer, and if the value of the mobility management back-off timer is longer than the current value of the second context timer, the second starting module 50 shall adjust the value of the second context timer; or the value of the mobility management back-off timer can be determined according to the value of the second context timer, and if the value of the mobility management back-off timer is longer than the current value of the second context timer, the second configuring module 70 shall adjust the value of the mobility management back-off timer.

Alternatively the value of the second context timer can be determined according to an operator strategy, and if there is the mobility management back-off timer, the value of the second context timer shall be ensured to be longer than that of the mobility management back-off timer. A specific operator strategy can refer to the strategies in FIG. 1, a repeated description of which will be omitted here.

In an implementation, the network-side device can be configured with a specific value, and the second managing module 60 can determine when the second timer will expire according to the specific value (L), for example, the second timer expires at a point of time which is the current time plus L, or the value is counted down directly and that the second timer expires is determined when the value becomes zero.

Alternatively the network-side device can be configured with a point of time, and the second managing module 60 can take this point of time as the point of time when the second timer expires.

If the second starting module 50 starts the second context timer immediately after the network congestion is removed, the operator strategies for the second context timer in this scenario can further be the following several ones in addition to the foregoing five strategies:

Strategy 1: An operator can determine from statistical data of network operation how long a request transmitted from the UE will be waited for after the network congestion is removed, e.g., one hour, and at this time the value of the second context timer can be configured by the network to one hour or a slightly longer time.

Strategy 2: The value of the second context timer is configured to two hours so long as the congestion is removed.

Strategy 3: The network configures the second context timer according to the value of the mobility management back-off timer transmitted to the UE when the congestion is removed (at a time T0). For example, a specific UE will initiate an access request after a specific time T as calculated from the value of a mobility management back-off timer configured for the UE by the network. The value of the second context timer configured at this time shall ensure that this timer will expire at a specific time T2 after the time T1, that is, the time T2 is required to be later than the time T1. Thus it can be ensured that the context of the UE has not been deleted by the network when the UE makes an access. The time T1 can be calculated according to a mobility management back-off timer indicated to any UE or can be calculated according to mobility management back-off timers indicated to a plurality of UEs, for example, the times of T1 calculated according to mobility management back-off timers indicated to three UEs are different, and then the second context timer can be determined from the calculated average of the three times or the second context timer can be determined from the latest one of the times of T1.

Strategy 4: The value of the second context timer is configured by a human operator through an operation, maintenance and administration system of the network when the congestion occurs.

It shall be noted that the strategy in the embodiment of the invention will not be limited to the foregoing four strategies and other strategies capable of setting the value of the timer will also be applicable to the embodiment of the invention.

Since a number of terminals may be rejected, in order to distinguish the first terminal from the second terminal, a preferable scheme is to distinguish the mobility management context of the first terminal from that of the second terminal. Specifically, the network-side device according to the embodiment of the invention can further include a flagging module 80.

The flagging module 80 is configured to make a special flag for the mobility management contexts of these terminals after the network is congested and the requests of the terminals are rejected and to delete the special flag of the mobility management context of a terminal if a request from the terminal is accepted and the mobility management context of the accepted terminal has the special flag after the network congestion is removed.

Correspondingly, the second managing module 60 keeps the mobility management contexts without the special flag and deletes the mobility management contexts with the special flag after the second context timer expires.

Of course, making of the special flag is merely an approach, and other approaches can be adopted, for example, the flagging module 80 lists the mobility management contexts of the rejected terminals into a blacklist and deletes the mobility management context of an accepted terminal in the blacklist; and the second managing module 60 deletes the mobility management contexts in the blacklist after the second context timer expires.

If the second starting module 50 starts the second context timer immediately after the network is congested, such a scenario may possibly occur that the network congestion is removed very soon but the second timer has not expired, and a preferable scheme may be that the second managing module 60 stops the second context timer and determines that the second context timer expires if the network congestion is removed before the second context timer expires.

If the second starting module 50 starts the second context timer immediately after the network is congested, the network may be congested for such a long period of time that the congestion is not removed when the second timer expires, and a preferable scheme may be that the second starting module 50 restarts the second context timer if the network congestion is not removed when the second context timer expires.

The second managing module 60 can delete the mobility management context by directly deleting locally the mobility management context corresponding to the terminal. This scheme is applicable to such a scenario that the mobility management context includes an EPS bearer or includes no EPS bearer.

If the mobility management context includes an EPS bearer and/or a PDP context, another deletion scheme in addition to the foregoing scheme is as follows:

The second managing module 60 initiates an implicit detach procedure to delete the mobility management context corresponding to the terminal.

A specific implicit deletion procedure can refer to the 3GPP TS23.401 and TS23.060 protocols.

The network-side device according to the embodiment of the invention can be a node B (e.g., a macro node B, an evolved node B, a home node B, etc.) or an RN device or an MME or another network-side device.

Based upon the same inventive idea, a second method for handling a mobility management context is provided in an embodiment of the invention, and since this method addresses the problem under a similar principle to the second network-side device for handling a mobility management context, an implementation of this method can refer to the implementation of the second network-side device for handling a mobility management context, a repeated description of which will be omitted here.

Figure 4:
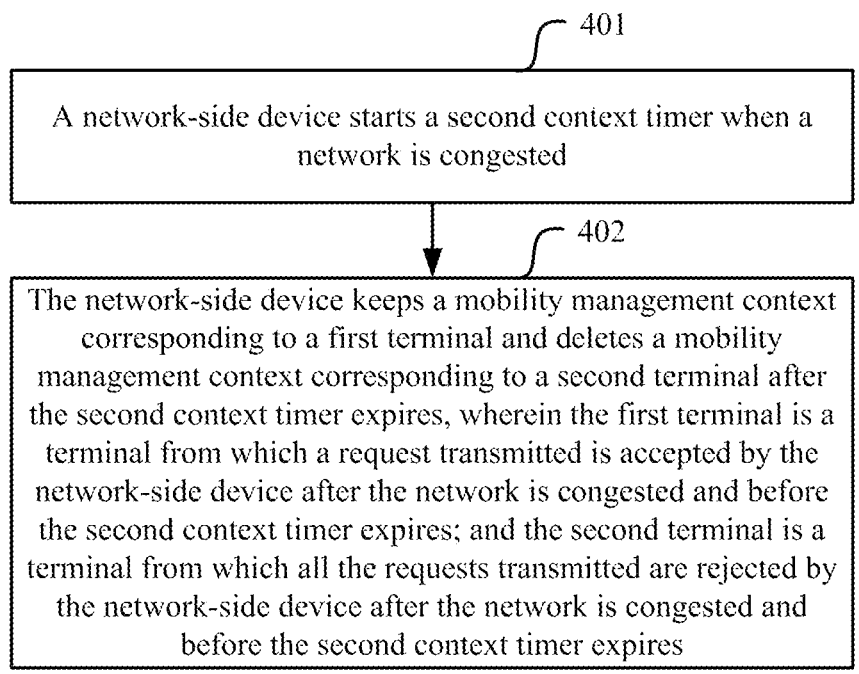
FIG. 4 is a schematic flow chart of a second method for handling a mobility management context according to an embodiment of the invention.

As illustrated in FIG. 4, a second method for handling a mobility management context according to an embodiment of the invention includes the following steps:

Step 401. A network-side device starts a second context timer when a network is congested.

Step 402. The network-side device keeps a mobility management context corresponding to a first terminal and deletes a mobility management context corresponding to a second terminal after the second context timer expires.

Wherein the first terminal is a terminal from which a request transmitted is accepted by the network-side device after the network is congested and before the second context timer expires; and the second terminal is a terminal from which all the requests transmitted are rejected by the network-side device after the network is congested and before the second context timer expires.

A number of terminals may initiate requests after the network is congested and before the second context timer expires, and the request from a terminal may be rejected by the network-side device if the network is congested. Among the terminals from which the requests transmitted are received by the network-side device, the terminal from which the request transmitted is accepted is referred to as the first terminal, and the other terminals are referred to as the second terminals.

In the step 401, the network-side device can start the second context timer immediately after the network is congested; or can start the second context timer immediately after the network congestion is removed.

In the scenario that the second context timer is started immediately after the network congestion is removed, the second context timer is not started after the network is congested and before the network congestion is removed, and the network-side device will consider that the second context timer has not expired.

Preferably, in order to enable the rejected terminal to reinitiate a request in a reasonable period of time, the network-side device can send to the terminal a mobility management back-off timer after the network is congested and the request from the terminal is rejected.

Specifically, the network-side device can send to the terminal the mobility management back-off timer via an NAS message.

The configured mobility management back-off timer includes an identifier and value of the mobility management back-off timer.

If the network-side device starts the second context timer immediately after the network is congested, the value of the second context timer shall be longer than that of the mobility management back-off timer.

Alternatively the value of the second context timer can be determined according to an operator strategy, and if there is the mobility management back-off timer, the value of the second context timer shall be ensured to be longer than that of the mobility management back-off timer. A specific operator strategy can refer to the strategies in FIG. 1, a repeated description of which will be omitted here.

In an implementation, the network-side device can be configured with a specific value, and the network-side device can determine when the second timer will expire according to the specific value (L), for example, the second timer expires at a point of time which is the current time plus L, or the value is counted down directly and that the second timer expires is determined when the value becomes zero.

Alternatively the network-side device can be configured with a point of time, and the network-side device can take this point of time as the point of time when the second timer expires.

If the network-side device starts the second context timer immediately after the network congestion is removed, a specific operator strategy can refer to the strategies in FIG. 3 for the second context timer in this scenario, a repeated description of which will be omitted here.

Since a number of terminals may be rejected, in order to distinguish the first terminal from the second terminal, a preferable scheme is to distinguish the mobility management context of the first terminal from that of the second terminal. Specifically, the network-side device rejects the requests of terminals and makes a special flag for the mobility management contexts of these terminals after the network is congested and deletes the special flag of the mobility management context of a terminal if a request from the terminal is accepted and the mobility management context of the accepted terminal has the special flag after the network congestion is removed.

Correspondingly in the step 402, the network-side device keeps the mobility management contexts without the special flag and deletes the mobility management contexts with the special flag after the second context timer expires.

Of course, making of the special flag is merely an approach, and other approaches can be adopted, for example, the network-side device lists the mobility management contexts of the rejected terminals into a blacklist and deletes the mobility management context of an accepted terminal in the blacklist, and deletes the mobility management contexts in the blacklist after the second context timer expires.

If the network-side device starts the second context timer immediately after the network is congested, such a scenario may possibly occur that the network congestion may be removed very soon but the second timer has not expired, and a preferable scheme may be that the network-side device stops the second context timer and determines that the second context timer expires if the network congestion is removed before the second context timer expires.

If the network-side device starts the second context timer immediately after the network is congested, the network may be congested for such a long period of time that the congestion is not removed when the second timer expires, and a preferable scheme may be that the network-side device restarts the second context timer if the network congestion is not removed when the second context timer expires.

The network-side device can delete the mobility management context by directly deleting locally the mobility management context corresponding to the terminal. This scheme is applicable to such a scenario that the mobility management context includes an EPS bearer or includes no EPS bearer.

If the mobility management context includes an EPS bearer and/or a PDP context, another deletion scheme in addition to the foregoing scheme is as follows:

The network-side device initiates an implicit detach procedure to delete the mobility management context corresponding to the terminal.

A specific implicit deletion procedure can refer to the 3GPP TS23.401 and TS23.060 protocols.

The network-side device according to the embodiment of the invention can be a node B (e.g., a macro node B, an evolved node B, a home node B, etc.) or an RN device or an MME or another network-side device.

Again two embodiments will be listed below for the first solution to handling a mobility management context.

In a first embodiment, an MME node detects congestion of a PDN and starts congestion control based upon an APN;

The MME receives an Attach request from a UE to connect to the APN with started congestion control;

The MME rejects the Attach request from the UE and indicates a mobility management back-off timer (an EMM back-off timer), i.e., a Timer-B-A, to the UE and keeps a context of the UE;

The MME starts a Timer 2 for the mobility management context of the UE;

The UE starts the Timer-B-A upon receiving the network indication, and the UE will not initiate an EMM procedure before the timer expires, and the UE reinitiates an Attach procedure immediately after the Timer-B-A expires; and The MME stops the Timer 2 if the MME receives the Attach request from the UE and accepts the request before the Timer 2 expires.

The MME deletes the mobility management context of the UE if no Attach request from the UE is accepted after the Timer 2 expires.

In a second embodiment, an MME node detects congestion of a PDN and starts congestion control based upon an APN;

The MME receives a TAU request from a UE to connect to the APN with started congestion control;

The MME rejects the TAU request from the UE and indicates an EMM back-off timer, i.e., a Timer-B-T, to the UE and keeps a context of the UE;

The MME starts a Timer 3 for the mobility management context of the UE;

The UE starts the Timer-B-T upon receiving the network indication, and the UE will not initiate an EMM procedure before the timer expires, and the UE reinitiates a TAU procedure immediately after the Timer-B-T expires; and The MME stops the Timer 3 if the MME receives the TAU request from the UE and accepts the request before the Timer 3 expires.

The MME deletes the mobility management context of the UE if no TAU request from the UE is accepted after the timer 3 expires.

Again two embodiments will be listed below for the second solution to handling a mobility management context.

In a first embodiment, an MME node detects congestion of a PDN and starts congestion control based upon an APN;

The MME receives an Attach or TAU request from a UE to connect to the APN with started congestion control;

The MME rejects the request from the UE and indicates a mobility management back-off timer, i.e., a Timer-B, to the UE, and at this time, the MME keeps a context of the UE and makes a special flag (sets a flag) for the mobility management context of the UE.

The UE starts the Timer-B upon receiving the network indication, and the UE will not initiate an EMM procedure before the timer expires, and the UE can reinitiate an Attach or TAU procedure immediately after the Timer-B expires;

The MME removes the congestion control based upon the APN and starts a Timer 1 after the MME detects that the congestion of the PDN is removed;

The MME clears the special flag of a specific UE if a request message from the UE is received before the Timer 1 expires; and The MME deletes all the mobility management contexts of UEs with the special flag (that is, deletes all the mobility management contexts for which the flag is set) after the Timer 1 expires.

In a second embodiment, an MME node detects congestion of a PDN and starts congestion control based upon an APN and a Timer 4;

The MME receives an Attach or TAU request from a UE to connect to the APN with started congestion control;

The MME rejects the request from the UE and indicates a mobility management back-off timer, i.e., a Timer-C, to the UE, and at this time, the MME keeps a context of the UE and makes a special flag (sets a flag) for the mobility management context of the UE.

The UE starts the Timer-B upon receiving the network indication, and the UE will not initiate an EMM procedure before the timer expires, and the UE can reinitiate an Attach or TAU procedure immediately after the Timer-B expires;

The MME removes the congestion control based upon the APN after detecting that the congestion of the PDN is removed;

The MME clears the special flag of a specific UE if a request message from the UE is received before the Timer 4 expires; and The MME deletes all the mobility management contexts of UEs with the special flag (that is, deletes all the mobility management contexts for which the flag is set) after the Timer 4 expires.

The embodiments of the invention have been described taking an EPS system as an example. Similarly, the inventive idea can be applicable to a GPRS system. At this time, the MME node in the EPS system corresponds to an SGSN node in the GPRS system, and the EMM procedure and the ESM procedure in the EPS system correspond respectively to a GMM procedure and a GSM procedure in the GPRS system. The same specific methods can be applicable thereto, and a repeated description thereof will be omitted in this context.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Since the value of storing the mobility management context at the network side is specified, signaling consumption and network load are thereby reduced, and resource utilization ratio is further improved.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method for handling a mobility management context, the method comprising:
  starting, by a network-side device, a first context timer for a terminal after a network is congested and a request from the terminal is rejected;
  keeping, by the network-side device, a mobility management context corresponding to the terminal if the request from the terminal is received and accepted before the first context timer expires; and
  deleting, by the network-side device, the mobility management context corresponding to the terminal if the request from the terminal is not received or the request from the terminal is received but not accepted before the first context timer expires;

wherein before starting, by the network-side device, the first context timer for the terminal after the network is congested and the request from the terminal is rejected, the method further comprises:
   sending, by the network-side device, to the terminal a mobility management back-off timer to instruct the terminal to retransmit a request to the network-side device after the mobility management back-off timer expires,
   wherein the value of the first context timer is longer than that of the mobility management back-off timer.

2. The method according to claim 1, wherein after the network-side device receives and accepts the request from the terminal before the first context timer expires, the method further comprises:
   stopping, by the network-side device, the first context timer.

3. The method according to claim 1, wherein deleting, by the network-side device, the mobility management context corresponding to the terminal comprises:
   deleting, by the network-side device, locally the mobility management context corresponding to the terminal.

4. The method according to claim 1, wherein the mobility management context includes an Evolved Packet System, EPS, bearer and/or a Packet Data Protocol, PDP, context; and
   deleting, by the network-side device, the mobility management context corresponding to the terminal comprises:
   initiating, by the network-side device, an implicit detach procedure to delete the mobility management context corresponding to the terminal.

5. The method according to claim 1, wherein the request is one of a request of an Evolved Packet System, EPS, Mobility Management, EMM, procedure, a request of an Evolved Packet System, EPS, Session Management, ESM, procedure, a request of a General Packet Radio Service, GPRS, Mobility Management, GMM, procedure and a request of a General Packet Radio Service, GPRS, Session Management, GSM, procedure.

6. The method according to claim 1, wherein the value of the first context timer is determined according to an operator strategy.

7. The method according to claim 1, wherein the first context timer is a mobile reachable timer or an implicit detach timer or a new timer.

8. A method for handling a mobility management context, the method comprising:
   starting, by a network-side device, a second context timer after a network is congested; and
   keeping, by the network-side device, a mobility management context corresponding to a first terminal and deleting a mobility management context corresponding to a second terminal after the second context timer expires,
   wherein the first terminal is a terminal from which a request transmitted is accepted by the network-side device after the network is congested and before the second context timer expires; and the second terminal is a terminal from which all the requests transmitted are rejected by the network-side device after the network is congested and before the second context timer expires;
   wherein after the network is congested and the network-side device rejects the request from the terminal, the method further comprises:
   sending, by the network-side device, to the terminal a mobility management back-off timer to instruct the terminal to retransmit a request to the network-side device after the mobility management back-off timer expires,
   wherein the value of the second context timer is longer than that of the mobility management back-off timer.

9. The method according to claim 8, wherein starting, by the network-side device, the second context timer comprises:
   starting, by the network-side device, the second context timer after the network congestion is removed.

10. The method according to claim 8, wherein after the network is congested and before the second context timer expires, the method further comprises:
    making, by the network-side device, a special flag for a mobility management context of a terminal and deleting the special flag of the mobility management context corresponding to the first terminal, if a request from the terminal is rejected;
    keeping, by the network-side device, the mobility management context corresponding to the first terminal comprises:
    keeping, by the network-side device, the mobility management context without the special flag; and
    deleting, by the network-side device, the mobility management context corresponding to the second terminal comprises:
    deleting, by the network-side device, the mobility management context with the special flag.

11. The method according to claim 8, further comprising:
    stopping, by the network-side device, the second context timer and determining that the second context timer expires if the network congestion is removed before the second context timer expires.

12. The method according to claim 8, wherein the request is one of a request of an EMM procedure, a request of an ESM procedure, a request of a GMM procedure and a request of a GSM procedure.

13. A network-side device for handling a mobility management context, the network-side device comprising:
    a first starting module configured to start a first context timer for a terminal after a network is congested and a request from the terminal is rejected;
    a first managing module configured to keep a mobility management context corresponding to the terminal when the request from the terminal is received and accepted before the first context timer expires and to delete the mobility management context corresponding to the terminal when the request from the terminal is not received or the request from the terminal is received but not accepted before the first context timer expires; and
    a first configuring module configured to send to the terminal a mobility management back-off timer before the first context timer is started for the terminal after the network is congested and the request from the terminal is rejected, to instruct the terminal to retransmit a request to the network-side device after the mobility management back-off timer expires,
    wherein the value of the first context timer is longer than that of the mobility management back-off timer.

14. The network-side device according to claim 13, wherein the first starting module is further configured:
    to stop the first context timer after the request from the terminal is received and accepted before the first context timer expires.

15. The network-side device according to claim 13, wherein the first managing module is specifically configured:
    to delete locally the mobility management context corresponding to the terminal.

16. The network-side device according to claim 13, wherein the mobility management context includes an EPS bearer and/or a PDP context; and the first managing module is specifically configured:
to initiate an implicit detach procedure to delete the mobility management context corresponding to the terminal.

* * * * *